United States Patent
Krishnamacharya et al.

(10) Patent No.: US 11,784,791 B2
(45) Date of Patent: *Oct. 10, 2023

(54) VERIFYING AN IDENTITY BASED ON MULTIPLE DISTRIBUTED DATA SOURCES USING A BLOCKCHAIN TO SAFEGUARD THE IDENTITY

(71) Applicant: EQUIFAX INC., Atlanta, GA (US)

(72) Inventors: Sri Krishnamacharya, Atlanta, GA (US); Quang Le, Atlanta, GA (US); Stan Tigrett, Atlanta, GA (US); Russ Ayres, Atlanta, GA (US)

(73) Assignee: Equifax Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/651,462

(22) Filed: Feb. 17, 2022

(65) Prior Publication Data
US 2022/0173887 A1 Jun. 2, 2022

Related U.S. Application Data

(63) Continuation of application No. 16/832,627, filed on Mar. 27, 2020, now Pat. No. 11,290,255, which is a
(Continued)

(51) Int. Cl.
*H04L 29/06* (2006.01)
*H04L 9/06* (2006.01)
(Continued)

(52) U.S. Cl.
CPC .......... *H04L 9/0637* (2013.01); *H04L 9/3239* (2013.01); *H04L 63/0428* (2013.01);
(Continued)

(58) Field of Classification Search
CPC . H04L 9/0637; H04L 9/3239; H04L 63/0428; H04L 63/083; H04L 63/126;
(Continued)

(56) References Cited

U.S. PATENT DOCUMENTS 10,129,252 B1 * 11/2018 Suen ............... H04L 63/0807
10,637,646 B2    4/2020 Krishnamacharya et al.
(Continued)

FOREIGN PATENT DOCUMENTS

EP    2809042 A1    12/2014
WO   2015162276 A2  10/2015

OTHER PUBLICATIONS

A. Yasin and L. Liu, "An Online Identity and Smart Contract Management System," 2016 IEEE 40th Annual Computer Software and Applications Conference (COMPSAC), 2016, pp. 192-198, doi: 10.1109/COMPSAC.2016.2. (Year: 2016).*
(Continued)

*Primary Examiner* — Ka Shan Choy
(74) *Attorney, Agent, or Firm* — Kilpatrick Townsend & Stockton LLP

(57) ABSTRACT

An online identity can be verified based on data from multiple identity sources stored in a blockchain. For example, a request for a token is received from an entity for authenticating an online identity of the entity to an online service. The request can be stored in a blockchain that represents the online identity of the entity by adding a new block to the blockchain. The new block can include data indicating the request for the token. The token can be generated based on the one or more ordered blocks in the blockchain. The token can be transmitted to the entity. The token can be received from the online service. Confirmation of the online identity of the entity can be transmitted to the online service based on receiving the token from the online service.

20 Claims, 7 Drawing Sheets

Related U.S. Application Data continuation of application No. 16/482,821, filed as application No. PCT/US2017/016061 on Feb. 1, 2017, now Pat. No. 10,637,646.

(51) Int. Cl.
  *H04L 9/32* (2006.01)
  *H04L 9/40* (2022.01)
  *H04L 9/00* (2022.01)

(52) U.S. Cl.
  CPC .......... *H04L 63/083* (2013.01); *H04L 63/126* (2013.01); *H04L 9/50* (2022.05)

(58) Field of Classification Search
  CPC ....... H04L 9/50; H04L 9/3231; H04L 9/3234; H04L 63/0421; H04L 63/0815; G06F 21/41; G06F 21/6254
  See application file for complete search history.

(56) References Cited

U.S. PATENT DOCUMENTS

| | | | |
|---|---|---|---|
| 2013/0047218 A1 | 2/2013 | Smith | |
| 2015/0356523 A1 | 12/2015 | Madden | |
| 2016/0164884 A1 | 6/2016 | Sriram et al. | |
| 2016/0182231 A1 | 6/2016 | Fontecchio | |
| 2016/0283941 A1 | 9/2016 | Andrade | |
| 2016/0308851 A1 | 10/2016 | Tiwari | |
| 2016/0328713 A1 | 11/2016 | Ebrahimi | |
| 2017/0017955 A1 | 1/2017 | Stern et al. | |
| 2017/0177855 A1 | 6/2017 | Costa Faidella et al. | |
| 2017/0180128 A1 | 6/2017 | Lu | |
| 2017/0344988 A1* | 11/2017 | Cusden | H04L 63/12 |
| 2017/0353311 A1* | 12/2017 | Schukai | H04L 9/0618 |
| 2017/0372300 A1 | 12/2017 | Dunlevy et al. | |
| 2018/0060496 A1 | 3/2018 | Bulleit et al. | |
| 2018/0262493 A1* | 9/2018 | Andrade | G06F 21/31 |
| 2018/0294965 A1* | 10/2018 | Yan | H04L 9/006 |
| 2018/0374097 A1* | 12/2018 | Hanna | H04L 63/123 |
| 2020/0027067 A1 | 1/2020 | Hertzog et al. | |

OTHER PUBLICATIONS

"Survey on Blockchain Technologies and Related Services", Nomura Research Institute, Available Online at: https://www.meti.go.jp/english/press/2016/pdf/0531_01f.pdf, Mar. 2016, 77 pages.

U.S. Appl. No. 16/482,821, "Corrected Notice of Allowability", dated Jan. 17, 2020, 2 pages.

U.S. Appl. No. 16/482,821, "Notice of Allowance", dated Dec. 27, 2019, 10 pages.

U.S. Appl. No. 16/832,627, "Non-Final Office Action", dated Jul. 16, 2021, 13 pages.

U.S. Appl. No. 16/832,627, "Notice of Allowance", dated Nov. 18, 2021, 10 pages.

Canadian Patent Application No. 3,052,415, "Notice of Allowance", dated Mar. 1, 2021, 1 page.

Canadian Patent Application No. 3,052,415, "Office Action", dated Sep. 14, 2020, 4 pages.

European Patent Application No. 17894846.9, "Extended European Search Report", dated Oct. 2, 2019, 9 pages.

European Patent Application No. 17894846.9, "Notice of Decision to Grant", dated Jun. 17, 2021, 2 pages.

Indian Patent Application No. 201937034977, "First Examination Report", dated Dec. 13, 2021, 10 pages.

International Application No. PCT/US2017/016061, "International Preliminary Report on Patentability", dated Aug. 15, 2019, 6 pages.

International Application No. PCT/US2017/016061, "International Search Report and Written Opinion", dated Oct. 12, 2017, 9 pages.

Australian Patent Application No. 2017397325, "First Examination Report", dated Dec. 2, 2022, 3 pages.

\* cited by examiner

VERIFYING AN IDENTITY BASED ON MULTIPLE DISTRIBUTED DATA SOURCES USING A BLOCKCHAIN TO SAFEGUARD THE IDENTITY

CROSS-REFERENCE TO RELATED APPLICATIONS

This application is a continuation application of U.S. patent application Ser. No. 16/832,627 filed Mar. 27, 2020; which is a continuation application of U.S. patent application Ser. No. 16/482,821 filed Aug. 1, 2019 and issued as U.S. Pat. No. 10,637,646 on Apr. 28, 2020; which is the National Stage of International Application No. PCT/US2017/016061, filed Feb. 1, 2017; all of which are incorporated by reference in their entireties for all purposes.

TECHNICAL FIELD

This disclosure generally relates to information security, and more particularly relates to verifying an identity based on multiple distributed data sources using a blockchain to safeguard the identity.

BACKGROUND

An entity (e.g., an individual or a business) can have an online identity based on a variety of information or characteristics about the entity, the assets associated with the entity, or devices associated with the entity. The online identity can be used by an online service to distinguish the entity from other entities prior to a transaction, via the online service, between the entity and the online service.

Different identity sources or forms of identification can be used to provide proof of an online identity. For example, an individual can have several different forms of identification including personally identifiable information (e.g., a driver's license number, a social security number, etc.) or biometrics (e.g., a fingerprint). A server running an online service can request a combination of identification sources from a computing device associated with a remote entity for verifying the online identity of the remote entity prior to the server providing the remote entity with a product, service, or access to sensitive information. Different online services can request different forms of identification. For instance, a server running a website for a loan provider may request information such as a social security number, a name, and a credit history, while a server running a website for a rental car provider may request a driver's license number, a credit card number, and a home address.

Some of the identification sources can have a long life. For example, a social security number or a mailing address may be associated with a given individual over many years. Thus, providing multiple sources of identification having long lives to online services can expose an entity to a risk of identity theft if electronic communications of these identification sources are intercepted by parties other than the online services.

SUMMARY

Aspects and examples are disclosed for verifying an identity based on multiple distributed data sources using a blockchain to safeguard the identity. For example, a processing device can receive a request for a token from an entity for authenticating an online identity of the entity to an online service. The processing device can store the request in a blockchain that represents the online identity of the entity by adding a new block to the blockchain. A blockchain can be a database with ordered blocks that are generated based on one or more identity sources that represent personally identifiable information of the entity. The new block added to the blockchain can include data indicating the request for the token. The processing device can generate the token based on the ordered blocks in the blockchain. The processing device can transmit the token to the entity, and can subsequently receive the token from the online service. The processing device can transmit, based on receiving the token from the online service, a confirmation of the online identity of the entity to the online service.

This illustrative example is mentioned not to limit or define the invention, but to aid understanding thereof. Other aspects, advantages, and features of the present invention will become apparent after review of the entire description and figures, including the following sections: Brief Description of the Figures, Detailed Description, and Claims.

BRIEF DESCRIPTION OF THE DRAWINGS

Many aspects of the present disclosure can be better understood with reference to the following diagrams. The drawings are not necessarily to scale, with emphasis instead being placed upon clearly illustrating certain features of the disclosure.

DETAILED DESCRIPTION

Figure 1:
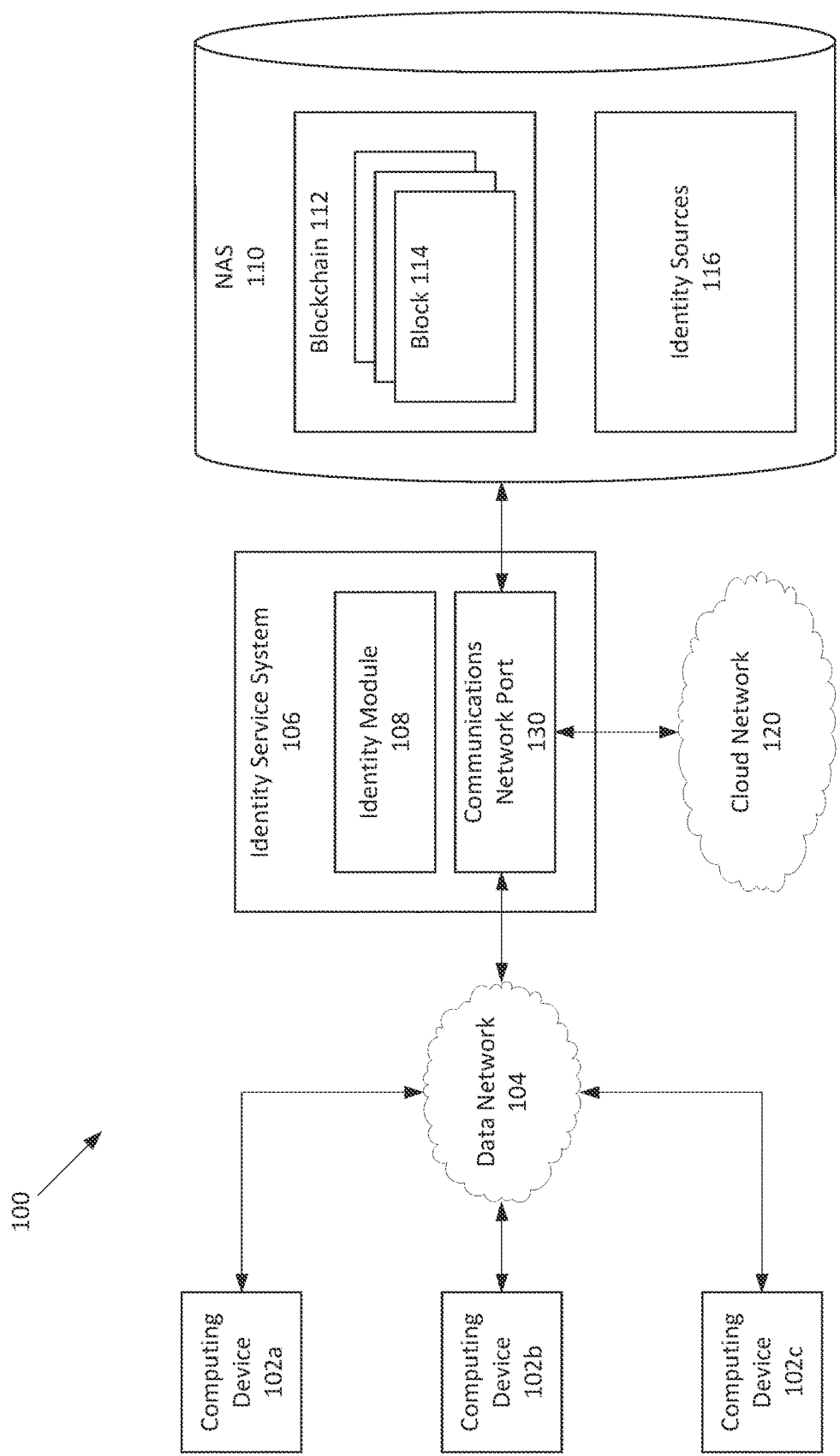
FIG. 1 depicts an example of a computing environment for verifying an identity based on multiple distributed data sources using a blockchain to safeguard the identity according to one aspect of the present disclosure.

Certain aspects of this disclosure relate to verifying an identity based on multiple distributed data sources using a blockchain to safeguard the identity. An identity service system can process multiple identity sources (e.g., government-issued documents or biometric measurements) associated with an entity (e.g., an individual or a business) to generate a blockchain that represents an online identity for the entity. A blockchain can be a database including multiple data blocks that are linked in series, where each data block is resistant to change and new data is added to the blockchain by adding a new data block to the end of the blockchain. The identity service system can generate a blockchain representing an online identity by linking blocks of encoded data formed from identity sources associated with an entity. Storing the identity in a blockchain can allow the identity service system to generate single-use tokens for authenticating the online identity of an entity to an online service. A token can include a signal, a packet of information, or a segment of code representing information that can be transferred between computing devices. In some aspects, using tokens can allow identities of entities to be verified without online services accessing the identity sources.

In some aspects, identity sources can include one or more of a variety of formats (e.g., text data, biometric data, and digital identity data) associated with an entity that is, for example, a consumer. Each identity source or identity source format can be stored separately in a secure database, which is communicatively coupled to (or included in) the identity service system. An online identity can be generated using text-based data (e.g., a social security number ("SSN"), a name, an address, or a driver's license number). An online identity can also be generated using biometrics data, which can be based on a stored feature of the entity such as a face, voice, fingerprint, iris, or DNA. The identity service system may store an actual image file or a custom template extracted from an original image. An online identity can also be generated based on the digital identity of devices associated with the entity such as a mobile device identifier (e.g., a MAC address), an internet-of-things device identifier, a phone number, or a geo-location. The identity service system can encode the identity sources and link the identity sources to form a blockchain representing the online identity. Any suitable encoding process can be used to encode data values in a blockchain (e.g., data values can be hashed by a hash function to obfuscate the data).

An identity service system can add new ordered blocks to the blockchain in response to receiving new identity sources or identity transactions (e.g., an authentication event in which the identity service system receives a request for authentication of an online identity). Each ordered block can have a timestamp and can be resistant to modification. The blockchain can therefore represent a history of the online identity associated with the entity. In an identity transaction, a hash value can be generated based on the blockchain. Adding a new ordered block to the blockchain can modify the hash value associated with the blockchain such that the hash value changes in response to every identity transaction.

In some aspects, a token can be generated for verifying the identity of an entity to an online service (or another entity) while preventing the online service from accessing any data that can be used to determine an identity source associated with the entity. For example, a server running a website for a rental car provider may request verification that an entity has a driver's license and is associated with a credit card before completing a rental transaction. The identity service system can verify that the entity has a driver's license and that the entity is associated with the credit card. The identity service system can generate a token that is a packet of information with a hash value based on the current blockchain and an address of the server. The identity service system can transmit the token to a computing device associated with the entity. The computing device transmit the token to the server. The server associated with the website can transmit the token or a message indicating the server's receipt of the token to the identity service system with a request for verification of the online identity of the entity.

In this example, the identity service system can transmit an authentication of the online identity and a confidence level in the authentication to the server in response to determining a hash value included in the token matches the current hash value of the blockchain. The identity service system can also add a new block to the blockchain in response to transmitting the authentication, which can alter the hash value of the blockchain and prevent the token from being reused. In additional or alternative aspects, a token can be generated that authorizes an online service to have temporary access to a specific identity source. For example, a server running a website for a government program may request a specific identity source (e.g., a SSN) and the identity service system can receive a request from the entity requesting temporary access be provided to the server.

An identity service system can give control of sensitive information (e.g., personally identifiable information) to the entity that is associated with the sensitive information. For example, the entity can reduce the number of online services that store, process, or display the identity sources (e.g., a SSN, a driver's license number, or a vocal pattern) by transmitting tokens to online services to serve as verification rather than an identity source. In additional or alternative aspects, the identity service system can link multiple sources of identification to create universal identities that capture identity sources from different countries. For example, a U.S. citizen that was born in India can have an Indian birth certificate and a U.S. passport linked together. Identity sources associated with the Indian birth certificate (e.g., credit in India) can be linked with identity sources associated with the U.S. passport (e.g., credit in the U.S.) to form a single online identity.

The features discussed herein are not limited to any particular hardware architecture or configuration. A computing device can include any suitable arrangement of components that provide a result conditioned on one or more inputs. Suitable computing devices include multipurpose, microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Referring now to the drawings, FIG. 1 depicts an example of a computing environment 100 that can be used for verifying an identity based on multiple distributed data sources using a blockchain to safeguard the identity. The computing environment 100 can be a specialized computing environment that may be used for processing large amounts of data using a large number of computer processing cycles. The computing environment 100 may include computing devices 102a-c, an identity service system 106, and one or more network-attached data stores ("NAS") 110. The computing environment 100 can also include a data network 104 for communicatively coupling the computing devices 102a-c with the identity service system 106.

The NAS 110 can include memory devices for storing identity sources 116 provided to the identity service system 106 by one or more components of the computing environment 100. The identity sources 116 can include personally identifiable information about an entity (e.g., an individual or a business). In some aspects, the identity sources 116 can include text data (e.g., SSN, a phone number, or an address), biometrics data (e.g., face or a voice composite), digital identity data (e.g., a MAC address of the computing device 102a associated with the entity), or a combination thereof.

The NAS 110 can also store a blockchain 112 that represents an online identity of an entity. The blockchain 112 can include blocks 114 that are generated by the identity service system 106 based on the identity sources 116. In additional or alternative aspects, the blocks 114 can be generated in response to requests received at the identity service system 106.

The NAS 110 may also store a variety of different types of data organized in a variety of different ways and from a variety of different sources. For example, NAS 110 may include storage other than primary storage located within identity service system 106 that is directly accessible by processors located therein. NAS 110 may include secondary, tertiary, or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored. Examples of a non-transitory medium may include, for example, a magnetic disk or tape, optical storage media such as compact disk or digital versatile disk, flash memory, or memory devices.

The identity service system 106 may be a specialized computer or other machine that processes the data received within the computing environment 100. The identity service system 106 can include one or more processing devices that execute program code, which includes an identity module 108 and is stored on a non-transitory computer-readable medium. The identity service system 106 can also include a communications network port 130 for communicatively coupling the identity service system 106 to other components and networks in the computing environment 100. In some aspects, the identity service system 106 can receive, via the communications network port 130, a request to verify the identity of an entity from the computing devices 102a-c. The identity module 108 can update the blockchain 112 based on the request and generate a token that includes a hash value based on the blockchain 112. The identity module 108 can transmit the token to the computing device 102a-c via the communications network port 130 for verifying the identity of the entity. In additional or alternative aspects, the identity module 108 can receive the token via the communications network port 130, compare the hash value with the current hash value of the blockchain 112, and provide confirmation of the identity in response to the hash value matching the current hash value. In some aspects, the confirmation can include an indication that an online identity associated with the entity is stored in the blockchain 112. In additional or alternative aspects, the confirmation can include an indication that the online identity is associated with a specific identity source requested by the online service. In additional or alternative aspects, the confirmation can include the specific identity source requested by the online service.

In some aspects, the identity service system 106 can receive a correction to one or more of the identity sources 116. The identity service system 106 can update the identity sources 116 with the correction and update the blockchain 112 to include another block 114 that indicates an update to one or more of the identity sources 116.

The identity service system 106 may include one or more other systems. For example, the identity service system 106 may include a database system for accessing the NAS 110, a communications grid, or both. A communications grid may be a grid-based identity service system for processing large amounts of data.

The computing devices 102a-c can be associated with an entity or an online service and can communicate with the identity service system 106. For example, the computing device 102a may be a mobile phone associated with an entity that can transmit identity source data to the identity service system 106 to be processed. In additional or alternative aspects, the computing device 102a may transmit a request to the identity service system 106 to generate a token for authenticating the online identity of an entity associated with the computing device 102a. The computing devices 102a-c may interact with the identity service system 106 via the data network 104.

In some aspects, the computing devices 102a-c may include network computers, sensors, databases, or other devices that may transmit or otherwise provide data to identity service system 106. For example, the computing devices 102a-c may include local area network devices, such as routers, hubs, switches, or other computer networking devices.

The computing environment 100 may also include one or more cloud networks 120. A cloud network 120 may include a cloud infrastructure system that provides cloud services. In certain examples, services provided by the cloud network 120 may include a host of services that are made available to users of the cloud infrastructure system on demand. A cloud network 120 is shown in FIG. 1 as being communicatively coupled to the communications network port 130 of the identity service system 106 (and therefore having identity service system 106 as its client or user), but the cloud network 120 may be communicatively coupled to or used by any of the devices in FIG. 1. Services provided by the cloud network 120 can dynamically scale to meet the needs of its users. The cloud network 120 may include one or more computers, servers, or systems. In some aspects, one or more end-user devices, such as one or more of the computing devices 102a-c, can access the identity service system 106, the NAS 110, or some combination thereof via the cloud network 120. The end-user devices can transmit, via the cloud network 120 and to the identity service system 106, data associated with additional identity sources 116 or requests for verification of an identity.

Each communication within the computing environment 100 (e.g., between client devices or between a server and a device) may occur over one or more networks 104. Networks 104 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in the network 104. The networks 104 can be incorporated entirely within (or can include) an intranet, an extranet, or a combination thereof. In one example, communications between two or more systems or devices can be achieved by a secure communications protocol, such as secure sockets layer ("SSL") or transport layer security ("TLS"). In addition, data or transactional details may be encrypted.

The numbers of devices depicted in FIG. 1 are provided for illustrative purposes. Different numbers of devices may be used. For example, while each device, server, and system in FIG. 1 is shown as a single device, multiple devices may instead be used.

Figure 2:
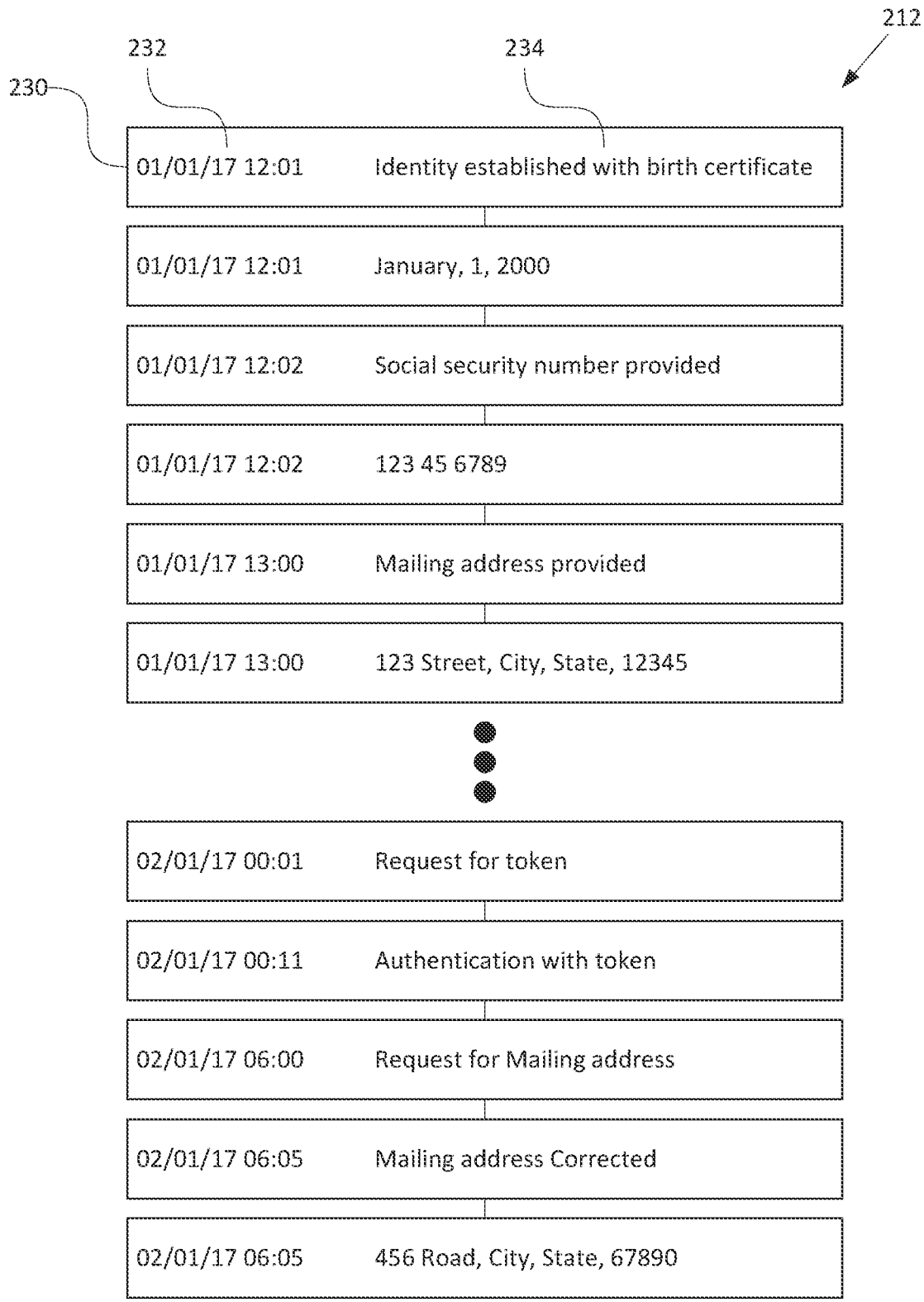
FIG. 2 depicts an example of a blockchain representing an online identity according to one aspect of the present disclosure.

FIG. 2 depicts an example of a blockchain 212 representing an online identity. The blockchain 212 includes a set of ordered blocks 230 linked in series. If new identity sources are provided for an entity, or new identity transactions are performed for an entity, new ordered blocks 230 can be added to the end of the blockchain 212. Each ordered block 230 can be assigned a respective timestamp 232. A timestamp 232 can indicate when the ordered block 230 was added to the blockchain 212. Each ordered block 230 can also include data 234. In some aspects, the data 234 can indicate that an identity transaction (e.g., an identity source was provided) or an authentications event (e.g., an online service requested verification of the online identity) occurred. In additional or alternative aspects, the data 234 can include data based on (or otherwise associated with) an identity source for a particular entity associated with the blockchain 212. For example, the data 234 can be an encoded version of a SSN or an encoded link to a retinal scan stored in memory. The data 234 can also indicate a fiduciary duty assumed by the holder of the online identity.

The online identity represented by the blockchain 212 can be separate from any documentation that would substantiate the existence or legitimacy of the entity that is associated with the online identity. The online identity can be pre-established by the identity service system 106 depicted in FIG. 1. The identity service system 106 can determine that the online identity is associated with the entity based on receiving identity sources from the entity. The identity sources can include government-issued documents such as, individually or combined, a birth certificate, a SSN card, a passport, a driver's license, biometrics (e.g., a photo, a fingerprint, voice data, an iris scan, a DNA sample), or other supporting documents such as a company employment registration, or an authentication by a notary public. Digital versions of these identity sources can be stored and validated as proof of the online identity being associated with the entity.

In response to a request for verification of the online identity being associated with an entity, the identity service system 106 can confirm the online identity of the entity and provide a confidence level based on the amount and type of identity sources the entity has provided. The confirmation can be provided without distributing the digital version of the identity sources or any data that can be used to determine the identity of the entity and the identity sources. For example, the entity can request a token for authenticating the online identity of the entity to an online service. The identity service system can generate the token and provide the token to the entity. The identity service system can provide confirmation to the online service in response to receiving the token from the online services. In additional or alternative aspects, the identity service system can provide a digital version of one or more of the identity sources to authenticate the online identity of the entity.

Figure 3:
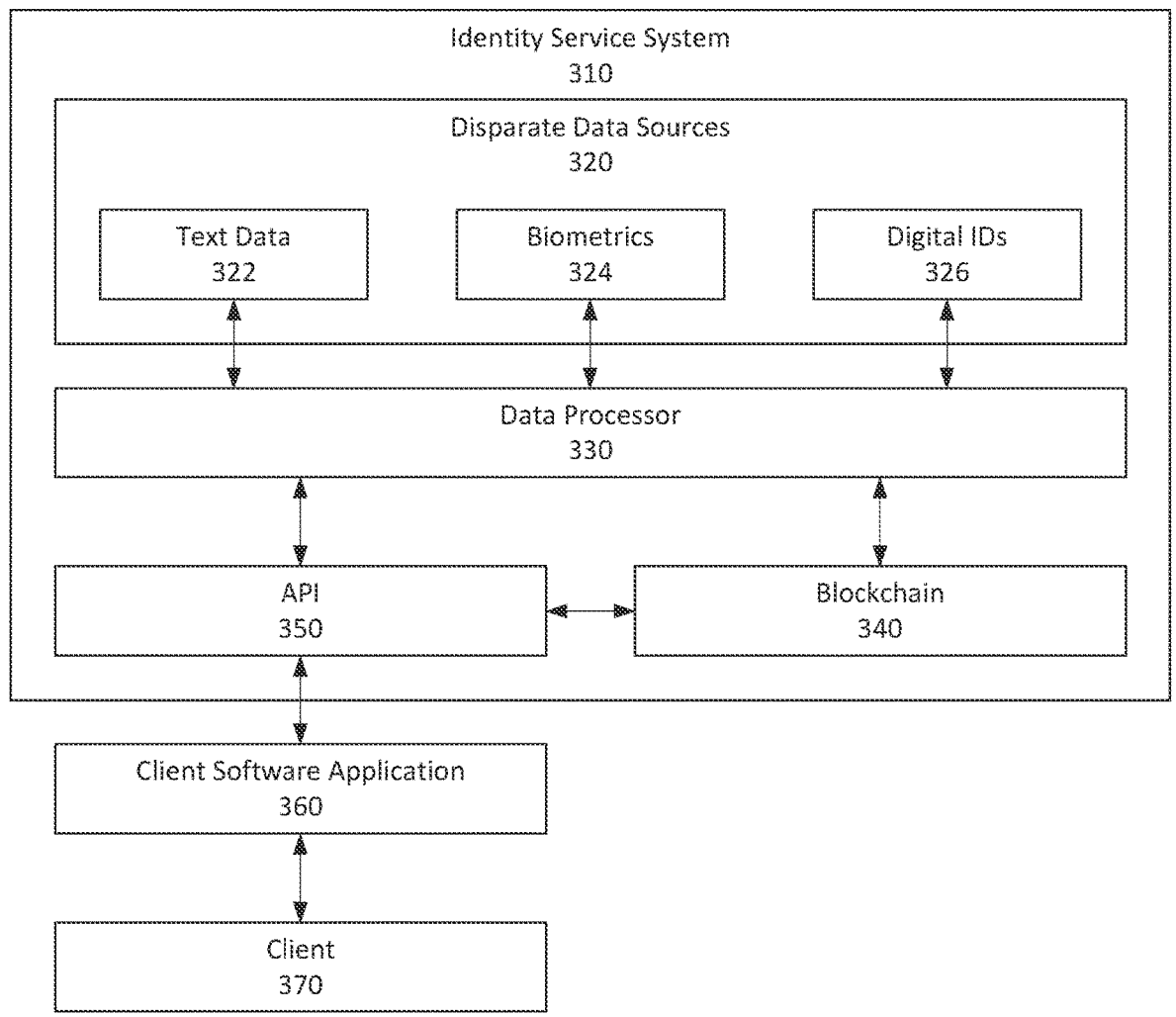
FIG. 3 depicts an example of an identity service system for verifying an identity based on multiple distributed data sources using a blockchain to safeguard the identity according to one aspect of the present disclosure.

FIG. 3 depicts an example of an identity service system 310 for verifying an identity based on multiple distributed data sources using a blockchain to safeguard the identity. The identity service system 310 can include disparate data sources 320, a data processor 330, a blockchain 340, and an application-programming interface ("API") 350. The example depicted in FIG. 3 can be used to implement the identity service system 106 depicted in FIG. 1.

The disparate data sources 320 can include private databases for multiple identity sources having multiple formats such as text data 322, biometrics 324, and digital identifiers 326. The private databases can be secure and encoded to prevent public access to sensitive information. In some aspects, the text data 322 can include a SSN, a name, an address, or a driver's license number. Biometrics data 324 can be data representing one or more features of a client 370 (e.g., an individual accessing the identity service system 310). Examples of these features include a face, voice, fingerprint, iris, and DNA. Actual image files or custom templates can be extracted from an original image and stored. The digital identifiers 326 can include identifying information about devices associated with the client 370 such as a mobile device identifier (e.g., a MAC address), an internet-of-things device identifier, a phone number, or a geo-location.

The API 350 can interface with a client software application 360 to allow communication between the identity service system 310 and the client 370. The API 350 can receive, from the client 370, identity sources to be stored in the disparate data sources 320. The API 350 can also receive identity transaction requests (e.g., a request to authenticate the online identity of the client 370 to another entity).

The data processor 330 can be communicatively coupled to the API 350 for receiving identity sources and identity transaction requests from the client 370. The data processor 330 can also be communicatively coupled to the disparate data sources 320 and the blockchain 340 for executing instructions received from the client 370. For example, the data processor 330 can update the disparate data sources 320 based on receiving identity sources from the client 370.

The blockchain 340 can be stored in a database that allows the blockchain 340 to be accessed and audited by the client 370 or other entities. The data processor 330 can generate the blockchain 340 based on the disparate data sources 320. The data processor 330 can maintain the blockchain 340 by adding blocks to blockchain 340 in response to identity transactions. An identity transaction can include a request from the client to update the disparate data sources 320, a request from the client to verify an online identity of the client 370, or some other transaction involving a use of the client's identity.

The data processor 330 can generate a token based on the blockchain 340 and transmit the token to the client 370. The token can include a hash value based on the size of the blockchain 340 and the encoded data in the blockchain 340. In some aspects, the size of the blockchain 340 can be determined based on the number of ordered blocks in the blockchain 340 or the amount of data stored in the blockchain 340. The hash value can be determined based on the size of the blockchain 340 without being affected by the meaning of the data stored in the ordered blocks.

The data processor 330 can receive the token from another entity and authenticate the online identity of the client 370 to the other entity based on the hash value included in the token matching the current hash value of the blockchain 340. In response to authenticating the online identity of the client 370, the data processor 330 can add a new block to the blockchain 340 that can change the current hash value of the blockchain 340.

Although the identity service system 310 in FIG. 3 is described as generating a token for authenticating an online identity of an entity to an online service, other implementations are possible. In some aspects, the identity service system 310 can use the blockchain 340 to verify an online identity of an entity without using a token. For example, the client 370 can be an online service and the identity service system 310 can receive a request from the client 370 to verify an identity of the entity. The request can include a form of identification (e.g., biometric data) and the identity service system 106 can identify the blockchain 340 as associated with the entity, and provide confirmation of the online identity of the entity to the client 370.

Figure 4:
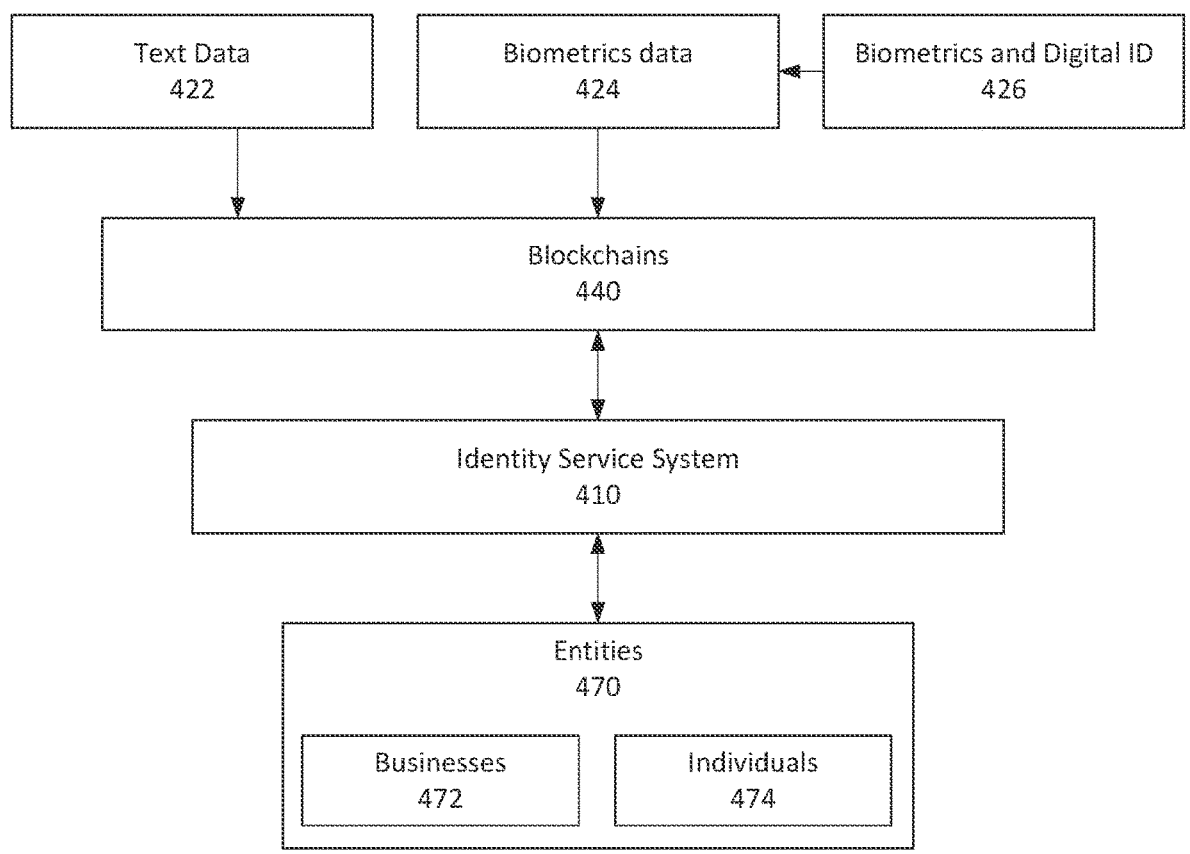
FIG. 4 depicts another example of an identity service system for verifying an identity based on multiple distributed data sources using a blockchain to safeguard the identity according to one aspect of the present disclosure.

FIG. 4 depicts an example of an identity service system 410 that is separate from the blockchains 440 and the identity sources. The identity service system 410 depicted in FIG. 4 can be used to implement the identity service system 106 depicted in FIG. 1. The identity service system 410 can receive signals from computing devices associated with entities 470. The entities 470 can include businesses 472 and individuals 474. In some aspects, the blockchains 440 can be generated and managed by a separate system. The blockchains 440 can be generated based on identity sources including text data 422 and biometrics data 424, which can be stored separately from the blockchains 440. The biometrics data 424 can be updated by receiving biometrics and digital identifier 426 from computing devices associated with the entities 470.

The identity service system 410 can receive identity sources from the entities 470 and associate a specific entity of the entities 470 with a specific blockchain of the blockchains 440. The identity service system can receive a request from the specific entity to verify the online identity of the specific entity to an online service and generate a token based on the specific blockchain. The identity service system can transmit the token to the specific entity, which can provide the token to the online service. The identity service system can receive the token from the online service, compare the token to the specific blockchain, and verify the online identity of the specific entity.

Figure 5:
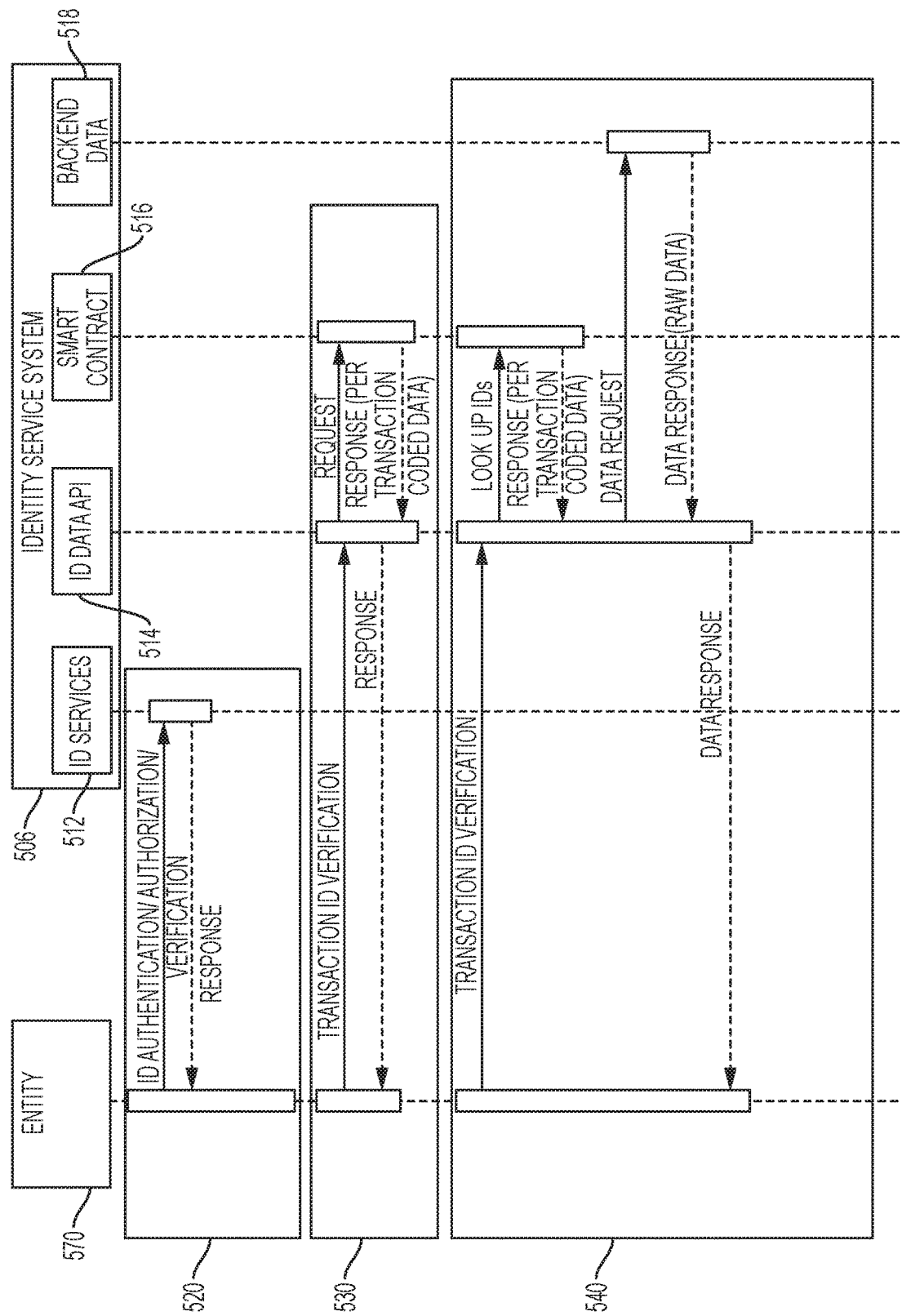
FIG. 5 depicts an example of a flow of information in a computing environment for verifying an identity based on multiple distributed data sources using a blockchain to safeguard the identity according to one aspect of the present disclosure.

FIG. 5 depicts a flow of information in a computing environment for verifying an identity based on multiple distributed data sources using a blockchain to safeguard the identity. An identity service system 506 (e.g., one or more the identity service systems 106, 310, 410) can improve identity security by transmitting a token rather than identity sources (e.g., SSN) to verify the online identity.

In block 520, the identity service system 506 communicates with an entity 570 to authenticate the entity 570 or otherwise determine an online identity of the entity 570. The identity service system 506 can receive a signal at an identity service module 512 from a computing device (e.g., a mobile phone) associated with the entity 570 providing proof of the online identity of the entity 570 or otherwise providing data that is used to authenticate the entity 570. In some aspects, the proof can be a username and password. In additional or alternative aspects, the proof can be a combination of text data, biometric data, and digital identity data. For example, the signal can include one or more of a name of the entity 570, a retinal scan of the entity 570, and a MAC address of the computing device. The identity service module 512 can determine the entity 570 matches an online identity and transmit a response signal to the computing device requesting instructions.

In block 530, the identity service system 506 transmits a token to the entity 570 in response to a request from the entity 570 to verify the online identity of the entity 570. The identity service system 506 can receive the request at an identifier data API module 514, which can process the request and transmit a request for the token to a smart contract module 516. The smart contract module 516 can determine a hash value of a blockchain and generate a token that includes the hash value. The smart contract module 516 can transmit the token to identifier data API module 514, which can transmit the token to the entity 570. In some aspects, the request from the entity 570 can indicate restraints such as a specific online service or a specific time to provide authentication of the online identity. The identifier data API module 514 can store the restraints in the token.

In block 540, the identity service system 506 transmits identity source data to the entity 570 in response to receiving the token from the entity 570. The identifier data API module 514 can receive a signal from the entity 570 including the token. The identifier data API module 514 can check the token to determine restrictions placed on the token (e.g., use by a specific online service or at a specific time). The identifier data API module 514 can also check the token to determine the amount of information to be transmitted to the entity 570. In this example, the token can include a request for raw data or identity source data. The identifier data API module 514 transmits a signal to the smart contract module 516 to determine if the token is valid (e.g., by comparing the hash value in the token with a current hash value in the blockchain). In response to determining that the hash value in the token is valid, the smart contract module 516 can add a new block to the blockchain indicating the identity transaction. Adding the new block can modify the hash value of the blockchain. The smart contract module 516 can transmit a signal to the identifier data API module 514 confirming the online identity of the entity 570 including encoded data from an identity source or a location of the identity source data requested in the token. In some aspects, the identifier data API module 514 can transmit a signal to a backend data module 518 requesting the identity source data and receive the raw data from the backend data module 518. In additional or alternative aspects, the identifier data API module 514 can determine identity source data by decoding the encoded data using a decoding process that corresponds to the encoding process used to encode the data in the blockchain. The identifier data API module 514 can transmit a signal to the entity 570 verifying the online identity of the entity 570 and providing the identity source data requested in the token.

Although the identity service system 506 is depicted as receiving the token from the entity 570, other implementations are possible. In some aspects, the token may be provided by the entity 570 to an online service, which could be an entity or a requesting device (e.g. an Internet-of-things device). The identity service system 506 can receive the token from the online service and provide confirmation of the online identity to the online service.

The blockchain managed by the identity service system 506 can represent a single online identity that can link different national identities. In some aspects, countries have national identifiers assigned to citizens that may be recognized only in the country because the country regulates the data be protected in a specific geographic area. In additional or alternative aspects, the online identity is a universal identity that can provide verification of various forms of identity with a single confirmation.

Figure 6:
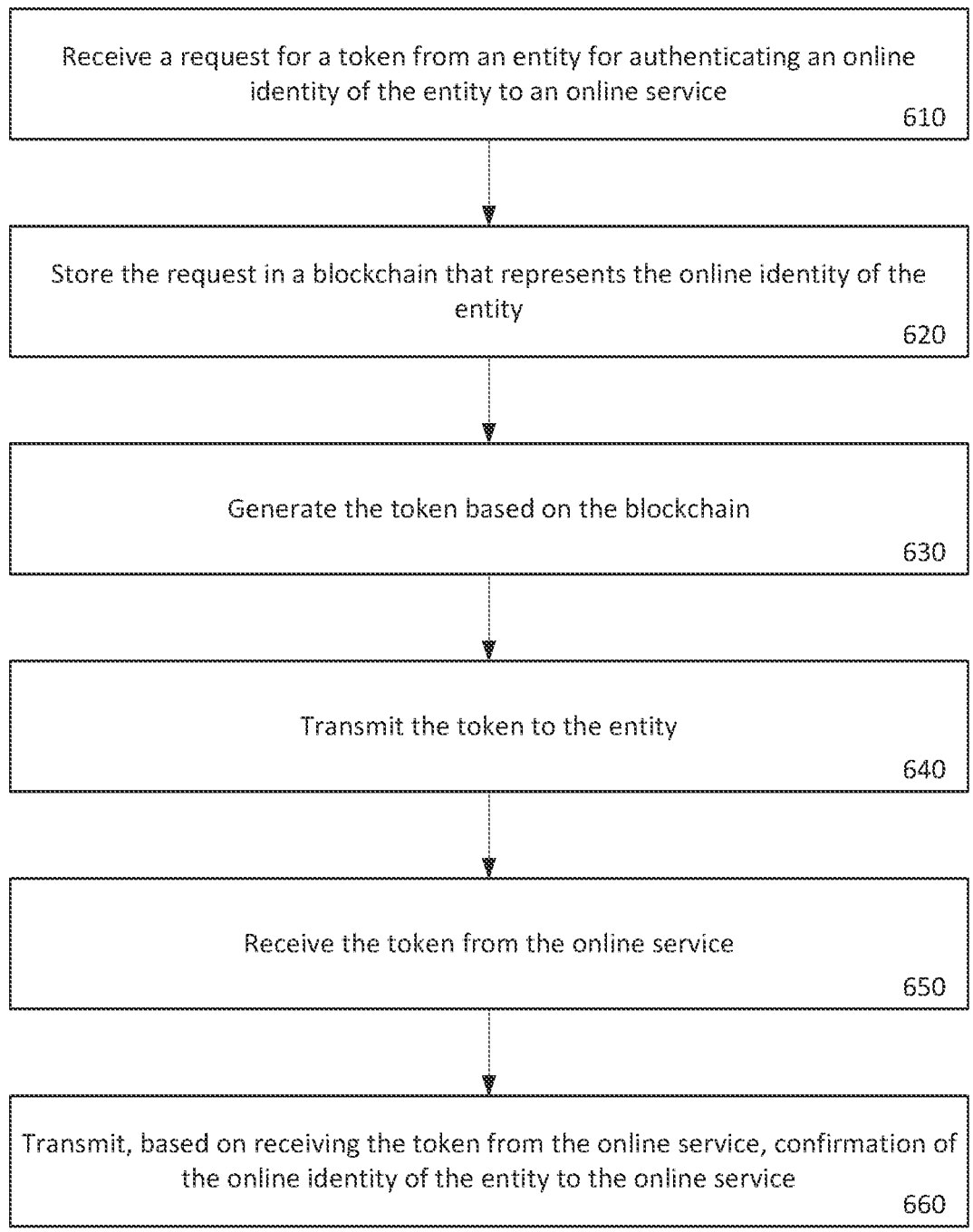
FIG. 6 depicts an example of a flowchart of a process for verifying an identity based on multiple distributed data sources using a blockchain to safeguard the identity according to one aspect of the present disclosure.

FIG. 6 is a flowchart of a process for verifying an identity based on multiple distributed data sources using a blockchain to safeguard the identity. The process can prevent identity theft by reducing the instances of identity sources being transmitted, stored, and displayed.

In block 610, a processing device receives a request for a token from an entity for authenticating an online identity of the entity to an online service. The request can include restrictions that indicate the amount of information transmitted to the online service. In some aspects, the entity can be an individual or a business seeking to participate in a transaction with the online service.

In block 620, the processing device stores the request in a blockchain that represents the online identity of the entity. In some aspects, the processing device stores the request by adding a new block to the blockchain, the new block including data indicating the request for the token. The blockchain can be a database including one or more ordered blocks based on identity sources that represent personally identifiable information of the entity. In some aspects, the blockchain is a public database and the ordered blocks include encoded versions of identity sources associated with the entity.

In block 630, the processing device generates the token based on the blockchain. The processing device can determine a hash value based on the data stored in the ordered blocks or the size of the blockchain. The token can include the hash value and any restrictions received as part of the request for the token from the entity.

In block 640, the processing device transmits the token to the entity. The entity can be associated with a computing device (e.g., a mobile phone) and the processing device can transmit a signal to the computing device including the token. In some aspects, the processing device can transmit the signal over a wireless network.

In block 650, the processing device receives the token from the online service. In some aspects, the online service can include a server that received the token from a computing device associated with the entity. The processing device can receive the token from the server over a wireless network.

In block 660, the processing device transmits confirmation of the online identity of the entity to the online service based on receiving the token from the online service. In some aspects, the processing device can transmit the confirmation based on determining that a hash value included in the token matches a current hash value of the blockchain. In additional or alternative aspects, the processing device can add a new block to the blockchain indicating the identity transaction.

In some aspects, the token can include a request for access to one or more identity sources. The processing device can determine the identity sources by decoding data in the blockchain or by receiving the identity sources from a separate memory that stores the identity sources.

Figure 7:
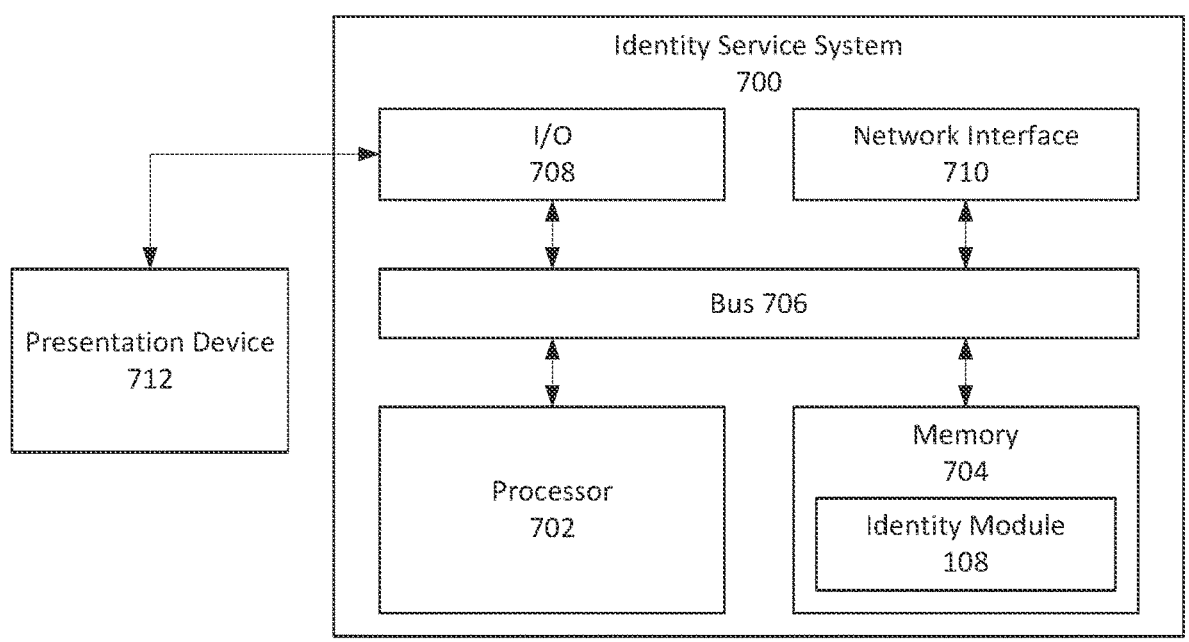
FIG. 7 depicts an example of an identity service system for verifying an identity based on multiple distributed data sources using a blockchain to safeguard the identity according to one aspect of the present disclosure.

Any suitable computing system or group of computing systems can be used to manage and verify an identity based on data from multiple identity sources that is stored in a blockchain as described herein. For example, FIG. 7 is a block diagram depicting an identity service system 700, which can be an example of one or more of the identity service systems 106, 310, 410, and 506 depicted in FIGS. 1 and 3-5. The identity service system 700 can include various devices for communicating with other devices in the computing environment 100, as described with respect to FIG. 1. The identity service system 700 can include various devices for performing one or more of the steps described above with respect to FIG. 5.

The identity service system 700 can include a processor 702 that is communicatively coupled to a memory 704. The processor 702 executes computer-executable program code stored in the memory 704, accesses information stored in the memory 704, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 702 include a microprocessor, an application-specific integrated circuit, a field-programmable gate array, or any other suitable processing device. The processor 702 can include any number of processing devices, including one. The processor 702 can include or communicate with a memory 704. The memory 704 stores program code that, when executed by the processor 702, causes the processor to perform the operations described in this disclosure.

The memory 704 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

The identity service system 700 may also include a number of external or internal devices such as input or output devices. For example, the identity service system 700 is shown with an input/output interface 708 that can receive input data from input devices and provide output data to output devices. A bus 706 can also be included in the identity service system 700. The bus 706 can communicatively couple one or more components of the identity service system 700.

The identity service system 700 can execute program code that includes the identity module 108. The program code for the identity module 108 may be resident in any suitable computer-readable medium and may be executed on any suitable processing device. For example, as depicted in FIG. 7, the program code for the identity module 108 can reside in the memory 704 in the identity service system 700. Executing the identity module 108 can configure the processor 702 to perform the operations described herein.

In some aspects, the identity service system 700 can include one or more output devices. One example of an output device is the network interface device 710 depicted in FIG. 6. A network interface device 710 can include any device or group of devices suitable for establishing a wired or wireless data connection to one or more data networks 104. Non-limiting examples of the network interface device 710 include an Ethernet network adapter, a modem, etc. In some aspects, the network interface device 710 can include one or more communications network ports, such as the communications network port 130 depicted in FIG. 1.

Another example of an output device is the presentation device 712 depicted in FIG. 7. A presentation device 712 can include any device or group of devices suitable for providing visual, auditory, or other suitable sensory output. Non-limiting examples of the presentation device 712 include a touchscreen, a monitor, a speaker, a separate mobile computing device, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, throughout this specification terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting. While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A system comprising:
    a processing device; and
    a memory device on which are stored instructions that are executable by the processing device to:
        access a blockchain that represents an online identity of an entity, the blockchain having a block that includes data indicating a request for a token for authenticating an online entity;
        generate the token based on one or more ordered blocks in the blockchain, wherein the one or more ordered blocks include encoded data from one or more identity sources that represent identifiable information of the entity;
        transmit the token to the entity, wherein the online identity of the entity is verifiable to an online service via the token;
        decode, based on the token, the one or more identity sources from the encoded data in the blockchain; and
        transmit the one or more identity sources to the online service for processing the one or more identity sources.

2. The system of claim 1, wherein the instructions that are executable by the processing device to generate the token are further executable by the processing device to:
    determine a first hash value for the blockchain based on the one or more ordered blocks in the blockchain;
    generate the token based on the first hash value such that the token is associated with the blockchain;
    receive the token from the online service; and
    transmit, based on receiving the token from the online service, a confirmation of the online identity of the entity to the online service,
    wherein the instructions that are executable by the processing device to transmit the confirmation of the online identity of the entity are executable by the processing device to:
        determine a current hash value for the blockchain based on the one or more ordered blocks in the blockchain in response to receiving the token;
        transmit the confirmation of the online identity of the entity while preventing the online identity from accessing the one or more identity sources in response to determining that the first hash value matches the current hash value; and
        store an authentication event as another new block in the blockchain such that the current hash value of the blockchain is modified.

3. The system of claim 1, wherein the blockchain is a first blockchain, and wherein the instructions are further executable by the processing device to:
    verify, based on the token, an identity of the online service based on a second blockchain that represents the online identity of the online service;
    verify that the token was requested by the entity for authenticating the online identity of the entity to the online service; and
    transmit, based on receiving the token from the online service, a confirmation of the online identity of the entity to the online service.

4. The system of claim 1, wherein the entity is one of: a business or an additional online service.

5. The system of claim 1, wherein the instructions are further executable by the processing device to:
    receive the one or more identity sources;
    store the one or more identity sources in a private database; and
    generate the blockchain representing the online identity of the entity by generating an ordered block based on each identity source of the one or more identity sources.

6. The system of claim 5, wherein the instructions are further executable by the processing device to:

determine, based on the token, a particular identity source of the one or more identity sources from the private database, wherein transmitting the one or more identity sources to the online service includes transmitting the particular identity source to the online service for processing the particular identity source.

7. The system of claim 1, wherein the instructions are further executable by the processing device to:
receive a correction to the one or more identity sources; and
store the correction in another new block in the blockchain such that a hash value based on the blockchain is modified.

8. A non-transitory computer-readable medium in which instructions executable by a processing device are stored for causing the processing device to:
access a blockchain that represents an online identity of an entity, the blockchain having a block that includes data indicating a request for a token for authenticating an online entity;
generate the token based on one or more ordered blocks in the blockchain, wherein the one or more ordered blocks include encoded data from one or more identity sources that represent identifiable information of the entity;
transmit the token to the entity, wherein the online identity of the entity is verifiable to an online service via the token;
decode, based on the token, the one or more identity sources from the encoded data in the blockchain; and
transmit the one or more identity sources to the online service for processing the one or more identity sources.

9. The non-transitory computer-readable medium of claim 8, wherein the instructions executable by the processing device to generate the token are further executable by the processing device to:
determine a first hash value for the blockchain based on the one or more ordered blocks in the blockchain;
generate the token based on the first hash value such that the token is associated with the blockchain;
receive the token from the online service; and
transmit, based on receiving the token from the online service, a confirmation of the online identity of the entity to the online service.

10. The non-transitory computer-readable medium of claim 9, wherein the instructions that are executable by the processing device to transmit the confirmation of the online identity of the entity are executable by the processing device to:
determine a current hash value for the blockchain based on the one or more ordered blocks in the blockchain in response to receiving the token;
transmit the confirmation of the online identity of the entity while preventing the online identity from accessing the one or more identity sources in response to determining that the first hash value matches the current hash value; and
store an authentication event as another new block in the blockchain such that the current hash value of the blockchain is modified.

11. The non-transitory computer-readable medium of claim 8, wherein the blockchain is a first blockchain, and wherein the instructions are further executable by the processing device to:
verify, based on the token, an identity of the online service based on a second blockchain that represents the online identity of the online service;
verify that the token was requested by the entity for authenticating the online identity of the entity to the online service; and
transmit, based on receiving the token from the online service, a confirmation of the online identity of the entity to the online service.

12. The non-transitory computer-readable medium of claim 8, wherein the entity is one of: a business or an additional online service.

13. The non-transitory computer-readable medium of claim 8, wherein the instructions are further executable by the processing device to:
receive the one or more identity sources;
store the one or more identity sources in a private database;
determine, based on the token, a particular identity source of the one or more identity sources from the private database, wherein causing the processing device to transmit the one or more identity sources to the online service includes transmitting the particular identity source to the online service for processing the particular identity source; and
generate the blockchain representing the online identity of the entity by generating an ordered block based on each identity source of the one or more identity sources.

14. The non-transitory computer-readable medium of claim 8, wherein the instructions are further executable by the processing device to:
receive a correction to the one or more identity sources that represent identifiable information of the entity; and
store the correction in another new block in the blockchain such that a hash value based on the blockchain is modified.

15. A method comprising:
accessing, by a processing device, a blockchain that represents an online identity of an entity, the blockchain having a block that includes data indicating a request for a token for authenticating an online entity;
generating, by the processing device, the token based on one or more ordered blocks in the blockchain, wherein the one or more ordered blocks include encoded data from one or more identity sources that represent identifiable information of the entity;
transmitting the token to the entity, wherein the online identity of the entity is verifiable to an online service via the token;
decoding, based on the token, the one or more identity sources from the encoded data in the blockchain; and
transmitting the one or more identity sources to the online service for processing the one or more identity sources.

16. The method of claim 15, wherein generating the token further comprises:
determining a first hash value for the blockchain based on the one or more ordered blocks in the blockchain;
generating the token based on the first hash value such that the token is associated with the blockchain;
receiving the token from the online service; and
transmitting, based on receiving the token from the online service, a confirmation of the online identity of the entity to the online service.

17. The method of claim 16, wherein transmitting the confirmation of the online identity of the entity further comprises:
determine a current hash value for the blockchain based on the one or more ordered blocks in the blockchain in response to receiving the token;

transmit the confirmation of the online identity of the entity while preventing the online identity from accessing the one or more identity sources in response to determining that the first hash value matches the current hash value; and store an authentication event as another new block in the blockchain such that the current hash value of the blockchain is modified.

18. The method of claim 15, wherein the blockchain is a first blockchain, and wherein the method further comprises:

verifying, based on the token, an identity of the online service based on a second blockchain that represents the online identity of the online service;

verifying that the token was requested by the entity for authenticating the online identity of the entity to the online service; and transmitting, based on receiving the token from the online service, a confirmation of the online identity of the entity to the online service.

19. The method of claim 15, wherein the entity is one of: a business or an additional online service.

20. The method of claim 15, further comprising:

receiving the one or more identity sources;

storing the one or more identity sources in a private database;

determining, based on the token, a particular identity source of the one or more identity sources from the private database, wherein transmitting the one or more identity sources to the online service includes transmitting the particular identity source to the online service for processing the particular identity source; and generating the blockchain representing the online identity associated with the entity by generating an ordered block based on each identity source of the one or more identity sources.

* * * * *